United States Patent [19]

Mokdad

[11] 4,423,342
[45] Dec. 27, 1983

[54] STEPPING MICROMOTOR CAPABLE OF ROTATION IN BOTH SENSES

[75] Inventor: Mohamed Mokdad, Bienne, Switzerland

[73] Assignee: Omega SA, Bienne, Switzerland

[21] Appl. No.: 449,806

[22] Filed: Dec. 14, 1982

[30] Foreign Application Priority Data

Dec. 18, 1981 [CH] Switzerland .................... 8108/81

[51] Int. Cl.³ .................................... H02K 7/10
[52] U.S. Cl. ............................ 310/41; 310/49 R; 310/191
[58] Field of Search ............... 310/41, 46, 49, 191, 310/209

[56] References Cited

U.S. PATENT DOCUMENTS

| | | | |
|---|---|---|---|
| 3,344,294 | 9/1967 | De Castelet | 310/191 |
| 3,493,831 | 2/1970 | Roberts, Sr. | 310/41 X |
| 4,103,191 | 7/1978 | Kawamura et al. | 310/49 |
| 4,167,848 | 9/1979 | Kitao et al. | 310/49 |
| 4,338,536 | 7/1982 | Hallidy | 310/191 |
| 4,371,821 | 2/1983 | Laesser et al. | 310/49 X |

FOREIGN PATENT DOCUMENTS 2427742 12/1979 Fed. Rep. of Germany .
2402340  3/1979 France .
1520968  8/1978 United Kingdom .

*Primary Examiner*—Donovan F. Duggan
*Attorney, Agent, or Firm*—Griffin, Branigan & Butler

[57] ABSTRACT

The stepping motor (1) is provided with magneto-mechanical means (11) in order to reverse the rotation sense of its rotor (2). When the magnetic element (12) is withdrawn or flush with the gap (3), the rotor turns in the sense of the arrow (27). When such element is extended into the gap through application of pressure to the push-piece (14), the rotor will turn in the sense opposite to that of the arrow (27).

7 Claims, 4 Drawing Figures

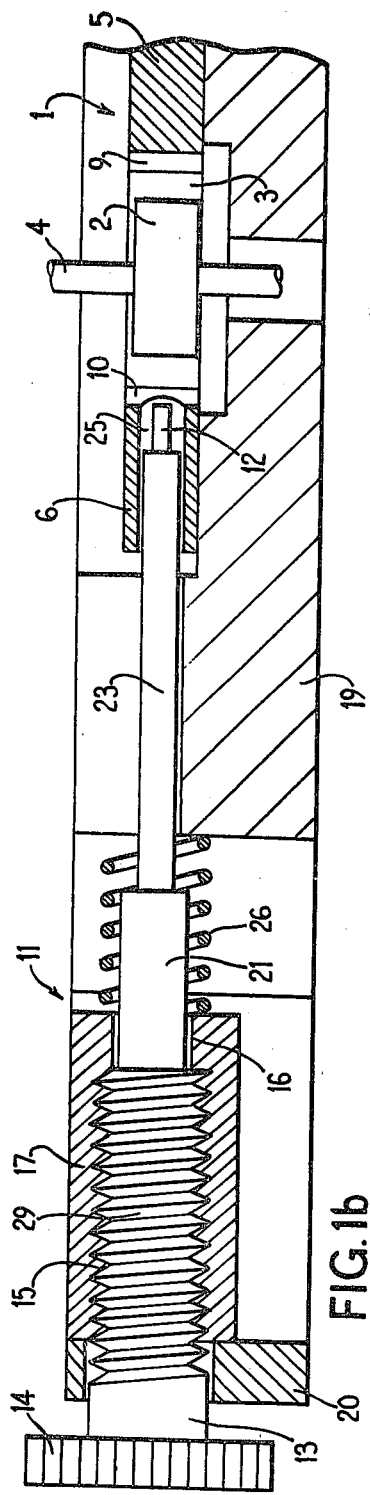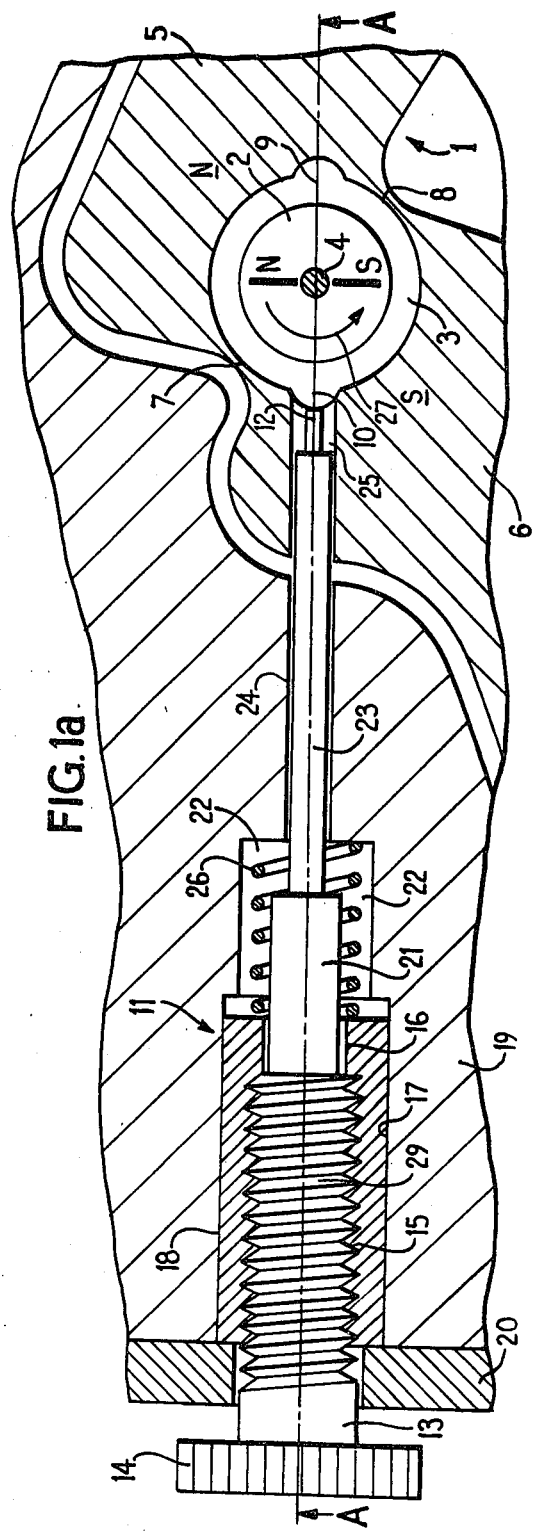
FIG.1b
FIG.1a

STEPPING MICROMOTOR CAPABLE OF ROTATION IN BOTH SENSES

BACKGROUND OF THE INVENTION

This invention concerns a rotary stepping motor for timepiece use comprising a core of magnetic material, a winding on said core, a stator magnetically coupled to said core and having two pole pieces separated or integrally formed with one another, a magnetized rotor encircled by said pole pieces exhibiting at least one pair of diametrally opposed poles, a gap separating the pole pieces from the rotor and magneto-mechanical means arranged and adapted to reverse the rotation sense of said rotor.

Micromotors equipped with magneto-mechanical means to reverse the rotation sense of a rotor are already known from the prior art.

Thus, German Pat. No. 1 006 806 describes a stepping motor provided with a U-formed bridle fixed to the stator. FIGS. 5 and 5a of this patent show that the arms of said bridle penetrate into a groove arranged in the soft iron poles of the rotor. Should the bridle be turned through 90°, the sense of rotation of the rotor will be reversed. In addition to the fact that this arrangement does not provide any means for adjusting the bridle, it will be understood that such will not be suitable for a watch stepping motor wherein the rotor is realized in a single piece with a circular magnet.

On the other hand, Swiss Pat. No. 613 349 discloses a watch steppping motor capable of rotation in two senses according to the position of a magnetic element pivotally mounted on one of the supports bearing the rotor. The construction proposed is awkward inasmuch as it requires considerable thickness and requires gear means should one wish to transform the rotational movement of the element into a longitudinal movement from a manual control stem.

The purpose of the present invention is to overcome these difficulties and thereby to propose means well adapted to a timepiece of small dimensions in order to reverse the rotation sense of its driving motor. Such means are set forth fully in the claims.

BRIEF DESCRIPTION OF THE DRAWINGS

FIG. 1a is a cross-section of the means for reversing the rotation sense of the rotor in accordance with the invention, said means being shown in its rest position.

FIG. 1b is a cross-section according to axis A—A of FIG. 1a.

DETAILED DESCRIPTION OF THE INVENTION

Figure 2:
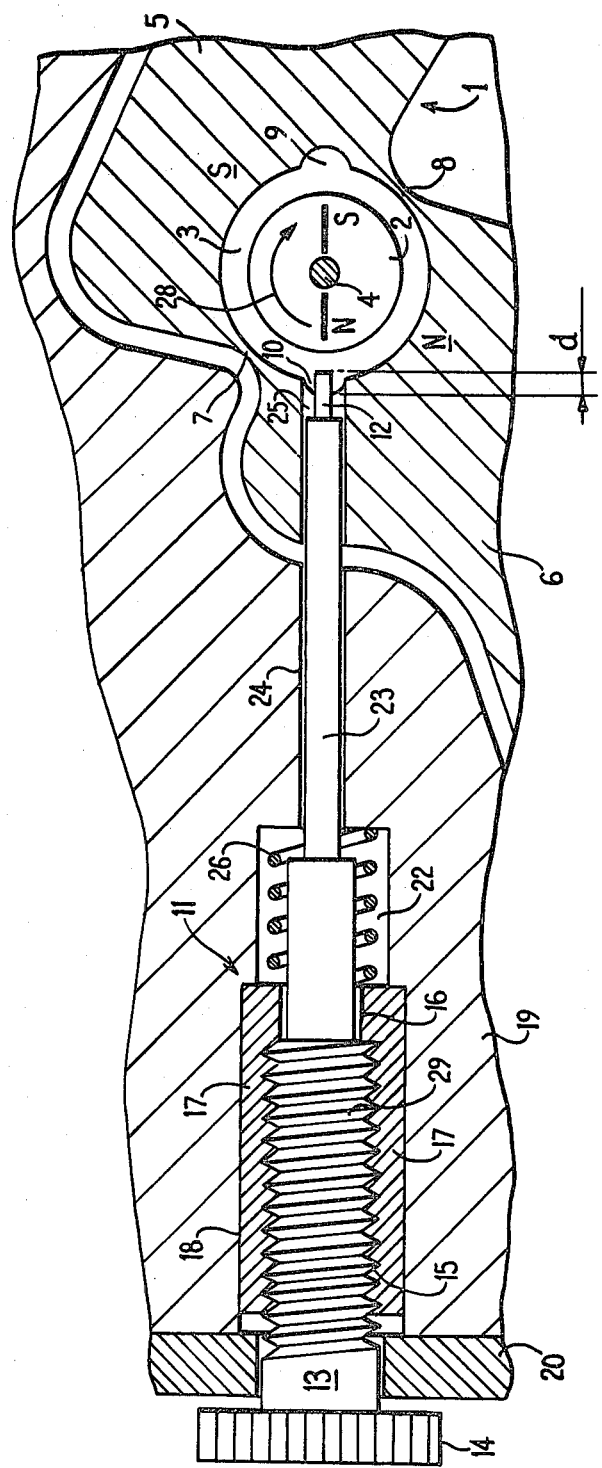
FIG. 2 is a cross-section of the means for reversing the rotation sense of the rotor in accordance with the invention, the means therein being shown in the operational position.

FIGS. 1a and 1b show a partial view of the motor 1 of the timepiece. Rotor 2 is formed from a permanent magnet of which the magnetization direction is diametral in order to form a pair of poles N-S. Such rotor turns around axis 4 which pivots in bearings (not shown). Encircling the rotor will be found a stator comprising two pole pieces 5 and 6 obtained through isthmuses or saturable zones 7 and 8. A magnetic core bearing a winding (not shown in the figure) is magnetically coupled to the stator as is well known from the prior art. Rotor 2 is separated from the pole pieces 5 and 6 by a gap 3 which appears in the example as shown in FIGS. 1a and 1b in the form of a circular space in which are arranged two notches 9 and 10 provided in the interior edge of the stator pole pieces. the construction which has just been described is sufficiently well known that it is unnecessary to provide further commentary or detail.

In accordance with the invention, the micromotor further comprises means 11 intended to reverse the operational sense of rotation of the rotor and which will now be described. This comprises basically an element in ferromagnetic material 12 which may penetrate into gap 3 in response to the actuation of control means 13 accessible from the exterior of the timepiece. As may be seen on FIGS. 1a and 1b, the control means 13 comprises a stem capable of sliding in the direction of its length and which bears at one end thereof the magnetic element 12 and at its other end a push-piece 14 to which may be applied the pressure of a finger.

According to the arrangement shown in the figures, portion 29 of the stem exhibits a thread 15 which is screwed into the threading 16 of an abutment element 17. The abutment element slides in an opening 18 provided in the base-plate 19 and is retained by an end-plate 20. A return coil spring 26 is placed around portion 21 of the stem and bears at one end on the bottom of a cavity 22 arranged in the base-plate and at the other end on the abutment element 17. Portion 23 of the stem passes through a first opening 24 in the base-plate and a second opening 25 in the stator pole piece 6. As may be seen on FIGS. 1a and 1b, this latter opening 25 gives access to gap 3 through the base of the notch 10.

As long as no pressure is exerted on push-piece 14, the abutment element 17 bears against the end-plate 20 under the force of return spring 26. The stem is in rest position and the magnetic element 12 is slightly outside the gap. The motor then behaves as a normal motor. The rest position between pulses is shown by the direction N-S. If a control pulse is applied to the motor winding and its polarity is such that pole piece 5 exhibits a North pole and pole piece 6 a South pole, the rotor will turn through 180° in the sense of arrow 27. At the next pulse the polarity of the pole pieces will be reversed and the rotor will again turn through 180° to return to the position as shown in FIG. 1a.

Figure 3:
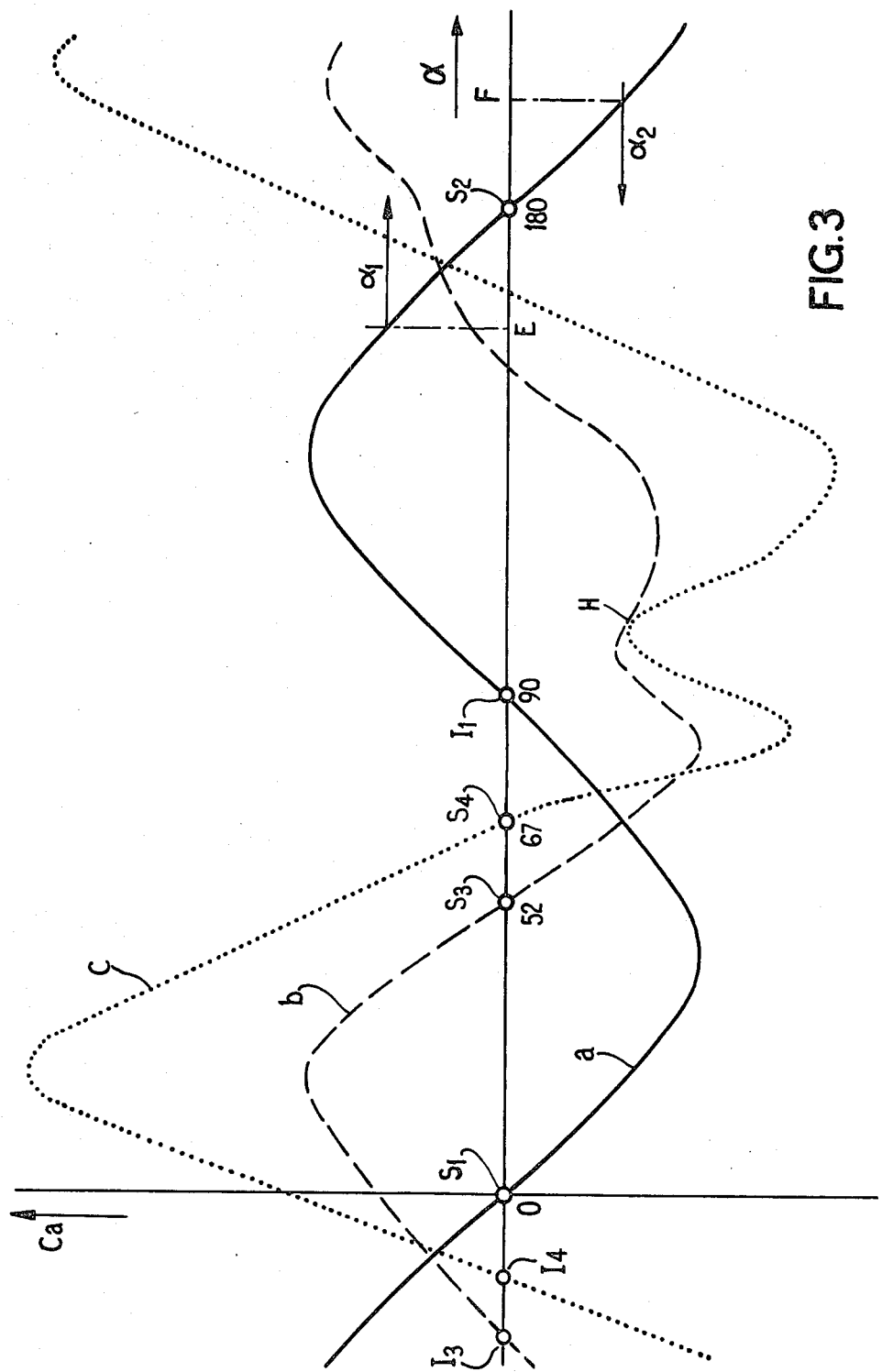
FIG. 3 provides graphs showing various stationary positioning couples of the motor as a function of the rotation angle of the rotor.

This situation is as shown by the curve (a) shown on FIG. 3. In this diagram there is plotted the positioning couple Ca of the rotor as a function of its rotation angle $\alpha$. For the construction shown as an example, the stable equilibrium positions are given by points $S_1$ and $S_2$ situated respectively at about 0° and 180°. The unstable equilibrium position is given by the point $I_1$ which, for the motor taken as an example, is located at an angle $\alpha$ of around 90°. For curve (a) as moreover in the case of the other curves shown on FIG. 3, the stable equilibrium point is always to be found at the place where the curves intersect the axis of the abscissae and present at the same time a negative slope. Thus, for curve (a) should one displace the rotor backwards from $S_2$ to E, it will return by itself to $S_2$. In the same manner, if one should displace the rotor forwardly from $S_2$ to F, it will return automatically to $S_2$ as shown by arrows $\alpha_1$ and $\alpha_2$.

We will now consider the situation should one actuate push-piece 14, this situation being illustrated in FIG. 2. In this case, the abutment element comes up against the bottom of opening 18 against the return force of spring 26. The stem is then in its operational position and magnetic element 12 penetrates into the gap 3 through the base of notch 10. The length of this penetration is symbolized by letter (d). At this moment the configuration of the reluctance of the magnetic circuit including the stator and the rotor magnet is modified and the rotor takes the theoretical position illustrated by the direction N-S of the magnet, as may be seen in FIG. 2. This theoretical position is displaced 90° relative to that shown in FIG. 1a. If a control pulse is applied then to the motor winding such that pole piece 5 shows a South pole and pole piece 6 a North pole, the rotor then will turn 180° in the sense of arrow 28, i.e. in a direction opposite to that when the stem is in its rest position. At the next pulse of inverted polarity, the rotor will again turn through 180° in order to be once more positioned as shown in FIG. 2.

The theoretical situation shown in FIG. 2 may be illustrated by the practical results obtained from measurements on the motor of the invention and which appear in FIG. 3. These results are shown in curves (b) and (c) for different lengths of penetration (d) of the magnetic element 12. In the motor under consideration, the curve (b) has been complied for a length (d) of 0.18 mm and curve (c) for a length (d) of 0.23 mm, while curve (a) is that already discussed above and for which the length (d) is equal to 0.

On FIG. 3, curve (b) presents a stable equilibrium position $S_3$ for $a=52°$ while curve (c) has as its stable equilibrium position $S_4$ for an angle of 67°, the positions of unstable equilibrium being shown at $I_3$ and $I_4$. Curves (b) and (c) show at H irregularities due to the non-symmetry of gap 3. It will be noted that without having been particularly sought after, this irregular figuration is favourable to the operation of the motor since it diminishes the amplitude of the positioning couple Ca, thus lowering the necessary energy to be furnished to the winding in order to cause the rotor to step. It will be noticed however that as the distance of penetration (d) increases the amplitude of the positioning couple Ca becomes more important, at the same time the angular position of the stable equilibrium is displaced. It thus becomes necessary to find a compromise between the positioning couple which should not be too great and reverse stepping which should be reliable in operation. Such compromise may be found either by choosing fixed suitable design dimensions or in foreseeing a fine regulation system for the penetration length (d) as appearing on FIGS. 1a, 1b and 2. In the latter case, it is possible to adjust the penetration of magnetic element 12 by screwing more or less of the threaded portion 29 of the stem into the threading of the abutment element 17. However, this may be effected, it will be understood that one may adjust to a positioning couple for the reverse operation which is less than that which obtains for normal operation since the reverse operation is above all employed for obtaining corrections of the time indications and at such moments there is less probability that the watch will undergo shocks which could affect such reverse operation.

From the preceding description of an example of the invention, it will be appreciated that simple and practicable means have been provided for incorporation into a stepping motor for a watch in order to obtain a reverse operation which may be used in order to correct the time shown, for example in the case where the watch is fast and in which no means has been provided for stopping its mechanism.

The arrangement described which comprises essentially the projection of a magnetic element into the gap of the motor in order to modify the distribution or the path of the magnetic flux and thus reverse the sense of rotation of the rotor is not limited to what has been described. For instance, the geometry of the gap may be different from that shown in the figures and may present in place of saturable zones 7 and 8 gaps separating pole pieces 5 and 6 or again cuts other than those shown by notches 9 and 10, for example a single notch or flattened portions. If figures 1a, 1b and 2 show a stem for which the axis intersects the axis 4 of the rotor and is perpendicular thereto, the magnetic element 12 penetrating into the gap through the base of the notch 10, it might also be imagined that such element 12 could penetrate into the gap 3 in a tangential manner or in any given angle if such manner of realization would facilitate the construction of the arrangement.

For evident reasons to reduce thickness, portion 23 of the stem crosses the segment of the pole piece 6 in opening 25. However, the portion 23 could equally be superposed over pole piece 6. In such case, the magnetic element 12 could take the form of a vane plunging into the gap 3 which, in the rest position, would be retracted into pole piece 6 and in the working position would be projected into the interior of gap 3.

In addition to the function which has just been described, the crown push-piece 14 may serve additional functions, for example to advance or return the hours hand through one or several time zones or to be coupled to electrical contacts which permit the advance or back-running of the hands in accordance with the rotation sense of the crown.

Finally, it will be understood that it is optional to provide the control means 13 with blocking means which prevents an undesired actuation of the reverse operation means.

Generally, the motor of this invention is provided with a stator which itself bears the necessary means to bring about a positioning couple. In the example shown in the figures, such means may be formed of notches 9 and 10 but could also be eccentric poles as known from the state of the art. A magneto-mechanical means, when actuated, will effect displacement of the normal location of the positioning couple in order thus to reverse the normal rotational sense of the rotor.

What we claim is:

1. Rotary stepping micromotor for timepiece use comprising a core of magnetic material, a winding on said core, a stator magnetically coupled to said core and having two pole pieces separated or integrally formed with one another, a magnetized rotor encircled by said pole pieces exhibiting at least one pair of diametrally opposed poles (N-S) a gap separating the pole pieces from the rotor and magneto-mechanical means arranged and adapted to reverse the rotation sense of said rotor wherein said means comprises a magnetic element capable of penetrating said gap in order to modify the stationary position angle of said rotor thereby to reverse the normal rotation sense when electric control pulses are applied to the winding.

2. A micromotor as set forth in claim 1 wherein said magneto-mechanical means includes control means manually operable from the timepiece exterior.

3. A micromotor as set forth in claim 1 wherein the gap includes two diametrally opposed notches set into the interior edge of the pole pieces, the magnetic element being arranged to penetrate the gap through the bottom of one of said notches.

4. A micromotor as set forth in claim 2 wherein said control means comprises a stem arranged to slide in the direction of its length and bearing at one end said magnetic element and at the other end a push-piece capable of manual actuation.

5. A micromotor as set forth in claim 4 wherein the stem may be brought from a rest position to an operational position against the return force of a spring and wherein at the rest position the magnetic element is flush with or outside the gap and in the operational position said magnetic element extends into said gap.

6. A micromotor as set forth in claim 4 wherein the stem slides along an axis intercepting and perpendicular to the rotor axis.

7. A micromotor as set forth in claim 4 wherein a portion of the stem slides within an opening provided within the thickness of one of the pole pieces of the stator.

* * * * *